United States Patent Office 3,193,450
Patented July 6, 1965

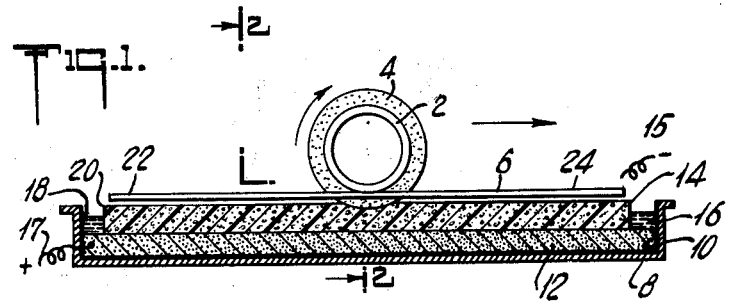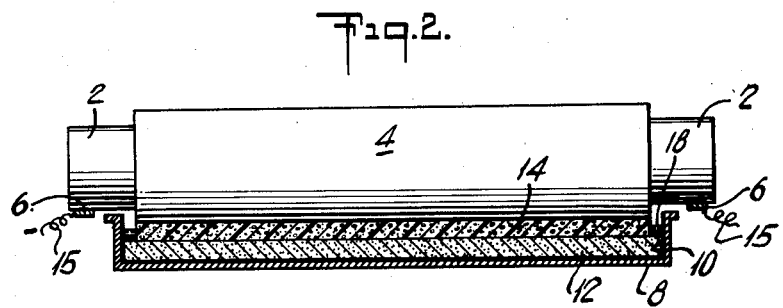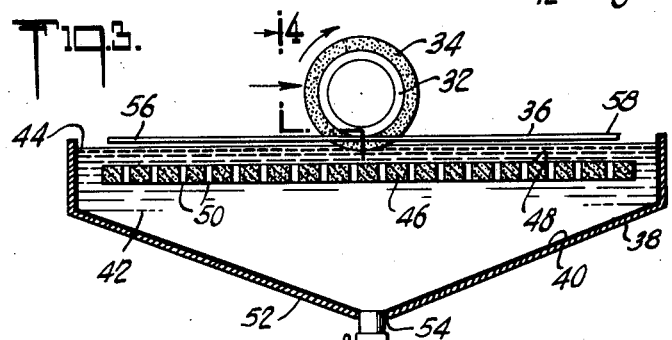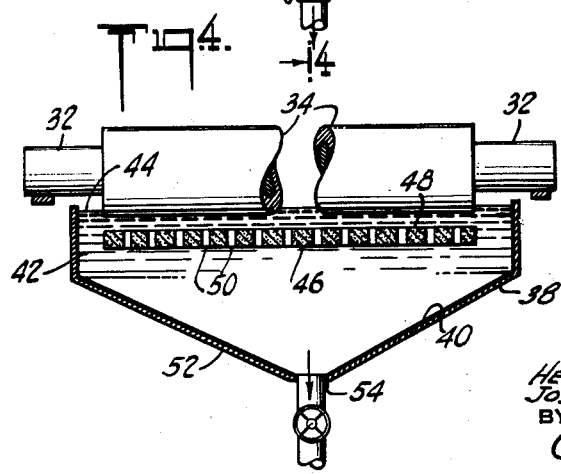

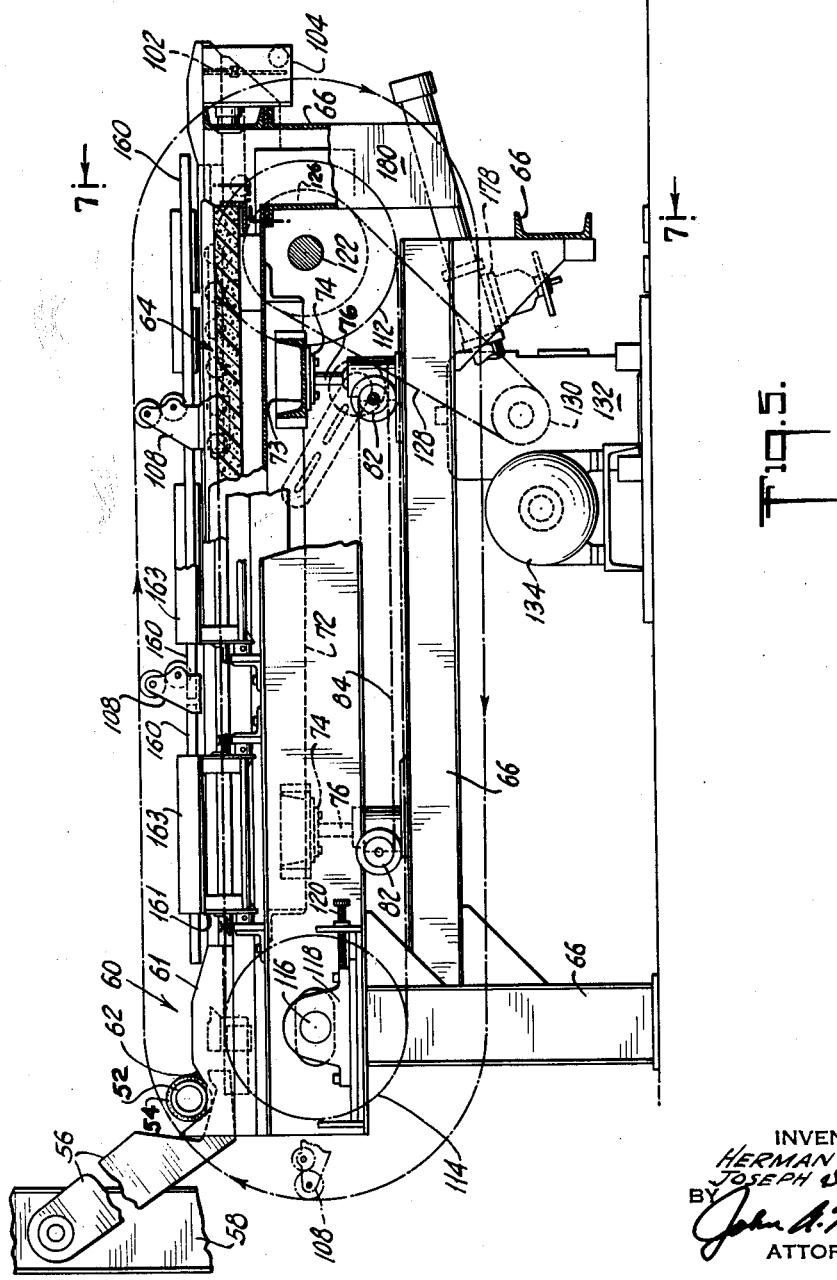

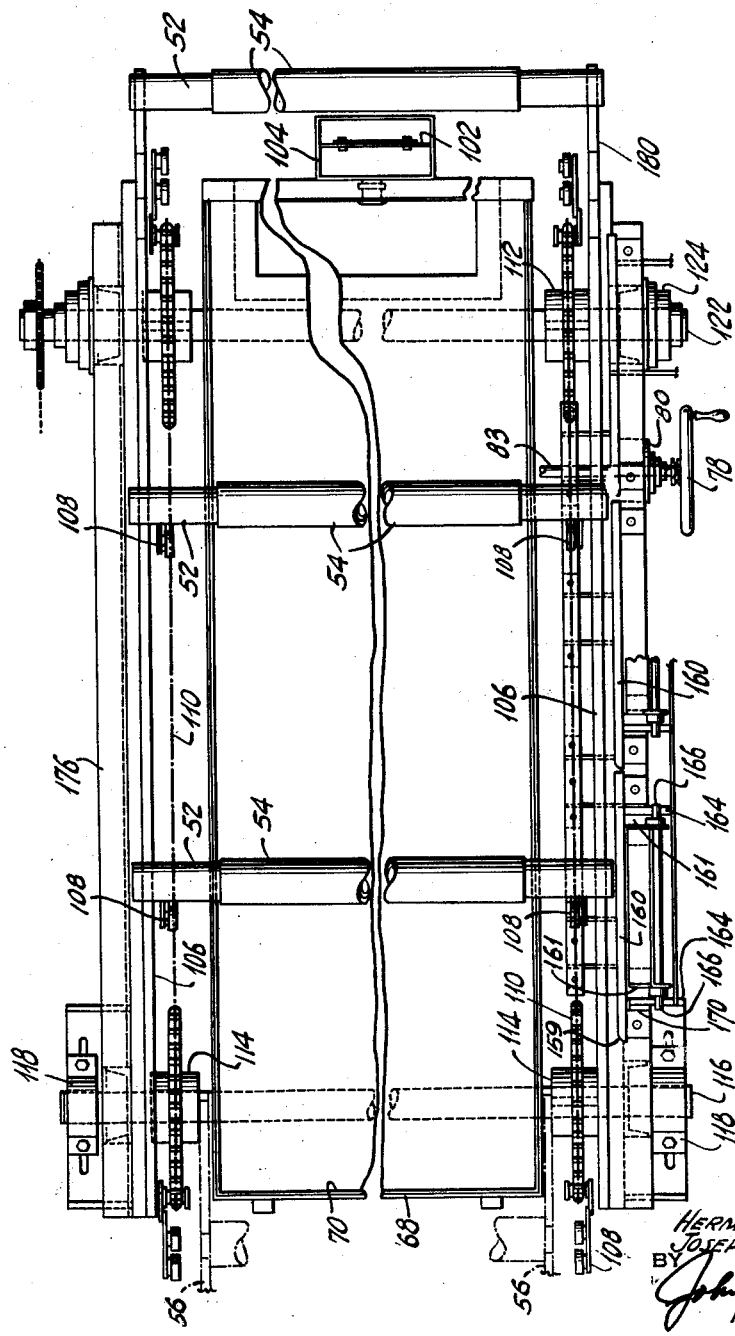

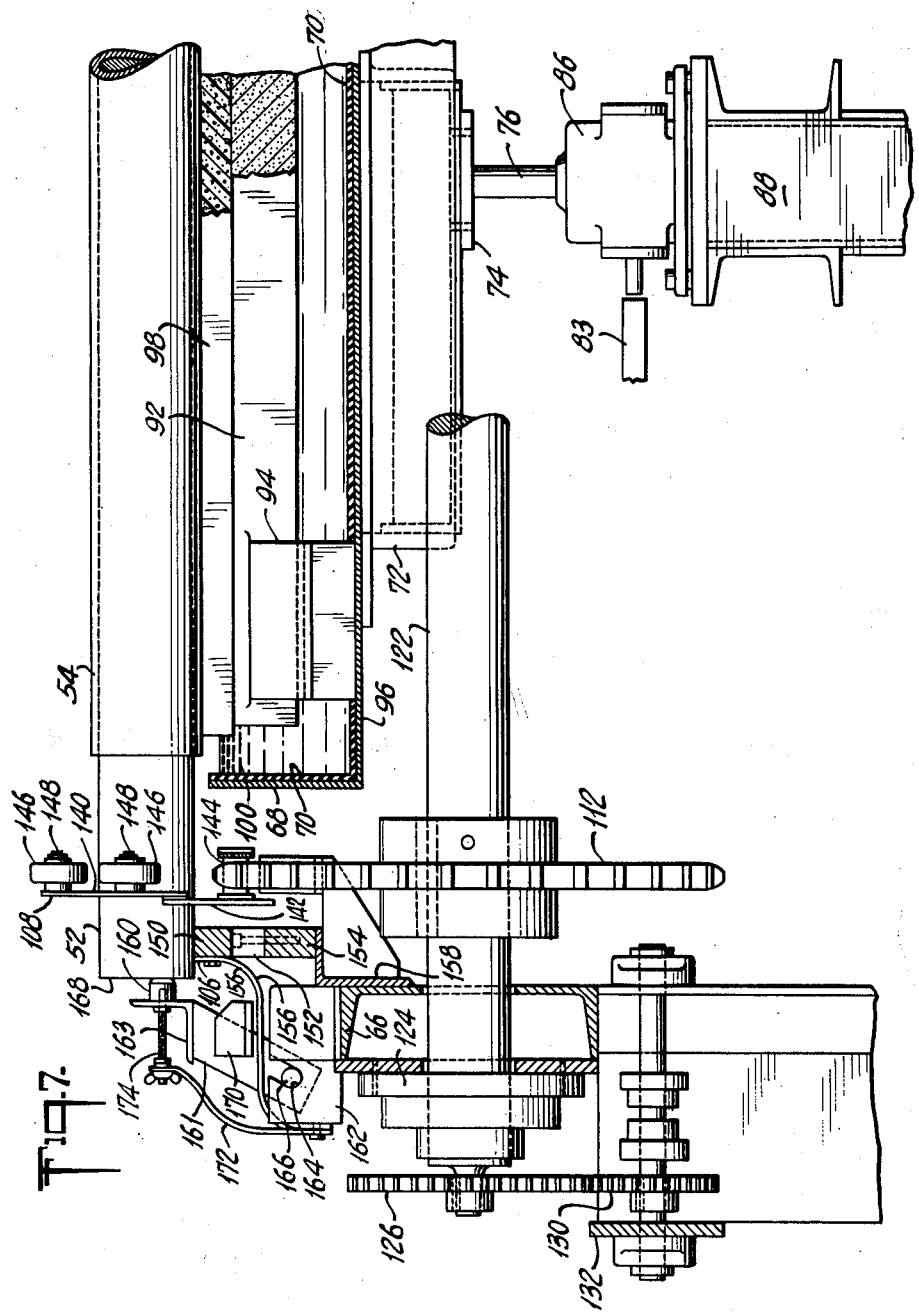

3,193,450
METHOD AND APPARATUS FOR LOOSENING WET PIPE FROM A MANDREL
Herman Herbert, Plainfield, and Joseph S. Angyal, Somerset, N.J., assignors to Johns-Manville Corporation, New York, N.Y., a corporation of New York
Filed Apr. 5, 1962, Ser. No. 185,402
9 Claims. (Cl. 162—192)

This invention relates to the manufacture of articles which are formed on a mandrel from a pulp of plastic stock, and more particularly relates to methods and apparatus for loosening such articles from the mandrels on which they are formed. A specific example of a general process to which the present invention may be applied is the manufacture of asbestos-cement pipe, and while the invention will be described with reference to such pipe, it is applicable in principle to the manufacture of other similar wet molded articles.

The conventional method of manufacturing asbestos-cement pipe involves winding a wet sheet of asbestos-cement pulp on a rotating, hollow mandrel while applying high pressure thereto. When a pipe of suitable wall thickness has been formed, the mandrel is removed from the pressure applying means and the formed pipe is then removed from the mandrel for curing. Because of the high pressure applied during the winding of the sheet stock on the mandrel, a firm bond develops between the pipe and the mandrel and it is necessary to break this bond to permit the removal of the wet asbestos-cement pipe from the mandrel without detrimental damage to the pipe end.

Many attempts have been made to devise a method of loosening the formed pipe from its mandrel without distorting the pipe or cracking or otherwise damaging its inner surface. Prior methods which have functioned to loosen successfully the pipe end from the mandrel so that the pipe could be removed from the mandrel and presently in commercial use utilize the method and apparatus illustrated in U.S. Patents No. 2,892,750 and 2,992,157. The systems described in the above-identified patents, while generally acceptable for a commercial operation, are not completely satisfactory since the wet asbestos-cement pipe during the loosening operation must be held stationary while the screen is wrapped around the wet asbestos-cement pipe or must be positioned for rotation on a fixed axis during the application of the electrical direct current. Either of these systems of loosening does not readily lend itself for cooperation with a continuous system for forming asbestos-cement pipe such as illustrated in U.S. Patents No. 2,929,447 and 2,977,276. Also, in the systems for loosening the wet asbestos-cement pipe from the mandrel in the above-identified patents, there is also some tendency for the electrodes to mar the surfaces of the pipe and because of the reactions occurring during the loosening procedure, the metal electrodes tend to deposit stains on the surface of the pipe. Also, because of the physical characteristics of the electrodes employed for the loosening operation, i.e., the rollers or the screen, the voltage drop across the pipe and the density of current flow through the pipe is not distributed uniformly over the entire surface of the pipe subjected to the electrode so as to result in a loss of voltage and of utilization of current density.

A primary object of the present invention is to provide method and apparatus for loosening wet pipe from a mandrel by the utilization of a non-corrosive electrode in contact with the wet pipe.

Another object of the present invention is to provide method and apparatus for loosening wet pipe from a mandrel by the utilization of a non-corrosive electrode in contact with the wet pipe in a continuously moving system.

Another object of the present invention is to provide method and apparatus for loosening wet pipe from a mandrel by an electrolytic system which utilizes the voltage impressed across the loosening area so that current density is at a maximum.

A further object of the instant invention is to provide method and apparatus for loosening wet pipe from a mandrel in an electrolytic system of loosening so that there is a minimum of physical force exerted on the surfaces of the wet pipe.

Another object of the instant invention is to provide method and apparatus for loosening a wet pipe from a mandrel in an electrolytic system of loosening so that there is no electrolytic decomposition of the electrode so as to deposit stains on the surface of the pipe.

The foregoing objects are accomplished in accordance with the instant invention by method and apparatus wherein a plurality of mandrels, each having a wet pipe, such as asbestos-cement, bonded thereto, are fed in sequence for movement relative to an electrolyte with the wet pipe in contact with the electrolyte. In the preferred embodiment of the instant invention, means are provided for moving each of the mandrels, substantially continuously and in a generally linear direction, over a container so that the wet pipe is in rolling contact with an electrolyte in the container. Each of said mandrels is connected to the negative terminal of an electrical direct current source and the electrolyte is electrically connected to the positive terminal of the electrical direct current source so as to cause a flow of relatively high amperage electrical direct current in a direction from said electrolyte through said wet pipe to said mandrel. Therefore, in accordance with the instant invention the mandrels having the wet pipe bonded thereto move through the electrical loosening system so that there is substantially continuous relative movement between the wet pipe and its associated electrode generally in a direction perpendicular to the longitudinal axis of the wet pipe during the loosening of the wet pipe. The method and apparatus disclosed herein may be utilized to loosen wet pipe from mandrels at production rates not possible by presently known systems. Also, because of the close, intimate contact between the surface of the pipe and the electrolyte, the voltage drop is held at a minimum while the utilization of the current density is at a maximum. It is further noted that the intimate contact between the surface of the pipe and the electrolyte is accomplished with a minimum of physical forces on the pipe.

The invention will be more fully understood and further objects and advantages thereof will become apparent when reference is made to the following detailed description of a preferred embodiment of the invention and the accompanying drawings in which:

FIG. 1 is a side view in cross section of a drawing illustrating schematically one type of apparatus made within the inventive concepts of the instant application;

FIG. 2 is a view taken on the line 2—2 of FIG. 1;

FIG. 3 is a view in cross section of a drawing illustrating schematically another type of apparatus within the inventive concepts of the instant application;

FIG. 4 is a view in cross section taken on the line 4—4 of FIG. 3;

FIG. 5 is a side elevation of apparatus made in accordance with the instant invention;

FIG. 6 is a top plan view of the apparatus of FIG. 5; and

FIG. 7 is a fragmentary cross-sectional view of the apparatus taken along line 7—7 of FIG. 5.

In FIGS. 1 and 2, there is illustrated a hollow steel mandrel 2 having bonded thereto a wet asbestos-cement pipe 4 wherein the mandrel 2 is supported in a pair of guide rails 6 preferably formed from an electrically conductive material or at least having a surface comprising an electrical conductive material for contact with the mandrel 2. A container 8 is positioned in adjacent relationship to the guide rails and in instances wherein the container 8 must be protected against corrosive or other deleterious action, it is lined with a suitable rubber or other desired type of material 10. A plate 12 of graphite or other electrically conductive material is supported on the bottom of the container 8. A sheet 14 of a resilient material, such as an open cell polyvinyl chloride foam which is pliable and has good resiliency and capillary action, is positioned on the plate 12. The container 8 is filled with an electrolyte 16 so that the sheet 14 is immersed in the electrolyte but the level 18 of the electrolyte is below the free, exposed surface 20 of the sheet 14 so that the sheet 14 of resilient material will by its capillary action provide a supply of the electrolyte 16 to be contacted by the surface of the wet asbestos-cement pipe 4. As illustrated in FIGS. 1 and 2, the level 18 of the electrolyte 16 is located approximately at the medial thickness line of the sheet 14. The guide rails 6 are positioned relative to the container 8 so that the wet asbestos-cement pipe 4 makes more than line contact with the free surface 20 of the resilient sheet 14. The guide rails 6 are electrically connected to the negative terminal of an electrical direct current source (not shown) by electrical conductor 15 and the plate 12 is electrically connected to the positive terminal of the same direct electrical current source by the electrical conductor 17.

In operation of the apparatus disclosed in FIGS. 1 and 2, a mandrel 2 having a wet asbestos-cement pipe 4 bonded thereto is initially positioned at one end 22 of the rails 6 and is moved over the rails 6 so as to have rolling contact therewith in the direction indicated by the arrows toward the end 24. If desired the wet asbestos-cement pipe 4 may be completely supported on the sheet 14 and in such instances electrical means other than the rails 6 are placed in contact with the mandrel 2. This rolling motion may be gravity actuated but in the preferred embodiment of the present invention, the movement of the mandrel 2 over the rails 6 is accomplished by a positive force applied to the mandrel. While the mandrel 2 is moving over the rails 6, loosening of the wet asbestos-cement pipe 4 from the mandrel 2 is accomplished by the flow of a relatively high amperage electrical direct current from the plate 12, through the electrolyte 16 in the sheet 14, and the wet asbestos-cement pipe 4 to the mandrel 2. Because of the close intimate contact between the sheet 14 and the wet asbestos-cement pipe 4, apparatus of the nature disclosed in FIGS. 1 and 2 provides for a uniform voltage drop over the entire surface area of the wet asbestos-cement pipe in contact with the electrolyte 16 in the sheet 14 and passes the electrical direct current uniformly through the system with a minimum heating of the pipe and electrical contacts. In this manner, the voltage drop is at a minimum while the utilization of current density is at a maximum so that the average power requirements for loosening are reduced. These features combined with the desirable features of non-corrosive contact between the wet asbestos-cement pipe and the electrolyte and the continuous movement of the wet asbestos-cement pipe and mandrel during the loosening operation produce the advantageous results disclosed in the instant invention.

The electrolyte 16 utilized in FIGS. 1 and 2 may comprise many of the known base or salt solutions such as calcium hydroxide, sodium chloride, sodium hydroxide and other similar types. Other types of electrodes, which may be substituted for the sheet 14 and the electrolyte 16, may be of the semi-liquid variety such as mercury filled to the desired level in the container 8 so as to contact the wet asbestos-cement pipe 4 or a type not dependent upon moisture such as gelatin type substances or carbon granules held together by a suitable binding substance or resilient substances having suitable electrical conductivity. It will be apparent that all of these substances which contact the asbestos-cement pipe may be aptly described as electrically conductive readily conformable materials.

In FIGS. 3 and 4, there is disclosed another form of apparatus made in accordance with the instant invention. As illustrated in FIGS. 3 and 4, a hollow steel mandrel 32 having bonded thereto a wet asbestos-cement pipe 34 is supported on a pair of guide rails 36 preferably formed from an electrically conductive material or at least having a surface of an electrically conductive material in contact with the mandrel 32. A container 38 is positioned in adjacent relationship to the guide rails 36 and, in instances wherein the container 38 must be protected against corrosive or other deleterious action, is lined with a suitable rubber or other desired type of material 40. The container 38 is filled with an electrolyte 42 to a level 44 so that the wet asbestos-cement pipe 34 supported by the mandrel on the rails 36 is submerged in the electrolyte 42 below the level 44. However, it is evident that the rails 36 must support the mandrel 32 so that no portion of the mandrel 32 is immersed in the electrolyte 42. A plate 46 of carbon or other electrically conductive material is positioned in the container 28 so that the upper surface 48 of the plate 46 is parallel but spaced from the level 44 of the electrolyte 32. The plate 46 is provided with a plurality of holes 50 for the drainage of any cement particles deposited thereon by the wet asbestos-cement pipe 34 as it passes through the electrical loosening system. The plate 46 mounted near the level 44 of the electrolyte 42 serves to reduce resistance to current flow in the electrolyte and to avoid a tendency of the container 38 to send current into the electrolyte. The container 38 is provided with inclined walls 52 sloped towards a drain 54 for the removal of asbestos-cement particles which may be deposited in the container 38. The guide rails 36 are electrically connected to the negative terminal of an electrical direct current source (not shown) and the plate 46 is electrically connected to the positive terminal of the electrical direct current source.

The apparatus disclosed in FIGS. 3 and 4 operates in a manner similar to the apparatus disclosed in FIGS. 1 and 2. A mandrel 32 having a wet asbestos-cement pipe 34 bonded thereto is initially positioned at one end 56 of the guide rails 36 and is moved over the rails 36 while in rolling contact therewith, in the direction indicated by the arrows, toward the end 58 of the guide rails 36. The rolling motion may be gravity actuated by the proper inclination of the guide rails 36 but preferably is accomplished by the application of a positive outside force directed on the mandrel 32. While the mandrel 32 is moving over the rails 36 in rolling contact therewith, the loosening of the wet asbestos-cement pipe 34 from the mandrel 32 is accomplished by the flow of a relatively high amperage electrical direct current from the plate 46 through the electrolyte 42, through the wet asbestos-cement pipe 34 to the mandrel 32. As stated above, a non-corrosive, non-injurious intimate contact is developed between the wet pipe and the electrolyte so that the voltage drop is at a minimum while current density is at a maximum so that the power requirements for loosening are substantially reduced when compared to prior methods for electrically loosening wet asbestos-cement from the mandrel.

Apparatus functioning in accordance with the method described above relative to the schematic illustrations in FIGS. 1–4, inclusive, is illustrated in FIGS. 5–7.

A freshly formed asbestos-cement pipe 54 on the mandrel 52 is deposited by a pair of feed arms 56 pivotally supported on member 58, onto a pair of cooperating waiting stations 60 each of which comprises a base 61 having a recess portion 62 for receiving the end portions of the mandrel 52. The asbestos-cement pipe 54 and the mandrel 52 are then passed through the electrolytic loosening system indicated generally at 64 supported by a plurality of conventional structural members 66.

A container 68, lined if desired, as explained above relative to the schematic illustrations of FIGS. 1–4, inclusive, with a suitable rubber 70 or other non-corrosive material, is mounted on a base 72 which is supported by suitable structural members 73 each of which is secured to a plate 74. Since it is desirable to have the container 68 adjustably mounted so as to accommodate differing sizes of asbestos-cement pipe, both as to diameter and wall thickness of pipe, the plates 74 are connected to and supported by a pair of movable pistons 76, the movement of which is controlled by hand wheel 78 rotatably supported in the block 80 and connected to operating mechanisms 82 by a rod 83. The movement of the pistons 76 is synchronized by connecting each of the operating mechanisms 82 thereof by an endless belt 84 so that each operating mechanism 82 is actuated substantially an identical amount by the rotation of the hand wheel 78. Each of the pistons 76 is housed in a container 86 suitably supported by structural members 88.

In the container 68, a plate 92 of graphite or other electrically conductive material is supported by a plurality of support members 94 in spaced but substantially parallel relationship to the bottom 96 of the container 68. The plate 92 is connected to the positive terminal of an electrical direct current source (not shown). A sheet 98 of a resilient material, such as an opened cell polyvinyl chloride foam, which is pliable and has good resiliency and capillary action, is positioned on the plate 92. The container 68 is filled with an electrolyte 100 so that the sheet 98 is immersed in the electrolyte but the level of the electrolyte is maintained below the free exposed surface of the sheet 98 so that the sheet 98 will by its capillary action provide a supply of the electrolyte 100 to be contacted by the wet pipe 54. As illustrated in FIG. 7, the level of the electrolyte 100 is located approximately at the medial thickness line of the sheet 98.

The level of the electrolyte 100 in the container 68 is maintained at the desired position by a conventional float valve arrangement 102 which regulates the flow of the electrolyte through the container 68 and the reservoir tank 104 which is connected to a conventional pumping arrangement (not shown). This reservoir tank 104 provides a convenient location for checking the concentration of the electrolyte solution and for the addition of any chemicals that may be required to maintain the proper solution concentration of the electrolyte.

Each end of the mandrel 52 is supported by guide rails 106 for rolling movement thereover. This rolling motion may be gravity actuated but in the preferred embodiment of the present invention, the movement of the mandrel 52 over the rails 106 is accomplished by a positive force directly applied to the mandrel. As illustrated in FIGS. 5–7, inclusive, this positive force for each mandrel is applied thereto by a pair of lugs 108 attached to a cooperating pair of moving endless chains 110, each of which is entrained around a driving sprocket 112 and an idler 114. Proper tension is maintained in each chain 110 by adjustably mounted idlers 114. As illustrated in FIG. 5, the axle 116, on which each idler 114 is supported, is mounted in boxes 118 each of which is adjustably supported and positioned in a conventional manner by worm arrangements 120. Each of the driving sprockets 112 is mounted on an axle 122 which is journaled in boxes 124. The axle 122 is provided with a gear 126, adjacent one end thereof, which is operatively connected through chain 128 to the main driving gear 130 rotated by suitable gears in the box 132 driven by a variable drive motor 134.

Each lug 108 comprises a pair of plates 140 and 142 secured to each other. Each plate 142 is detachably secured in a desired position to chain 106 by appropriate securing means 144. Each plate 140 carries a pair of rollers 146, preferably of non-electrical conductive material such as nylon, rotatably supported on studs 148 secured to the plate 140. The lugs 108 are detachably secured to the chains 110 so as to be readily changeable to accommodate different sizes of mandrels and for proper positioning of the lugs 108 on the chains 110 so that the lugs will move a mandrel from the waiting stations 60 at the appropriate time for movement through the electrolytic loosening system 64 in proper spaced relationship to the preceding mandrel and pipe moving through the system.

Each guide rail 106 comprises three sections; a conductor rail 150, a spacer 152 and a base 154. The conductor rail 150 is connected to the negative terminal of an electrical direct current source (not shown) through a plurality of covered insulated wire straps 156. The base 154 is mounted on a support member 158 secured to the basic structural support members 66.

A plurality of pivotally mounted bars 160 are positioned for contacting the ends of each mandrel 52 during passage of the mandrel through the electrolytic loosening system 64 and each bar provides an additional electrical contact means for the efficient passage of the electrical direct current. Each bar 160 is pivotally mounted through arms 161 connected by plate 163 in a pair of spaced apart members 162 having aligned slots 164 therein for receiving the pivots 166 for the bar 160 and is adapted to contact the end 168 of the mandrel 52 as illustrated particularly in FIG. 7. Each bar 160 is of a predetermined length so that during passage of the mandrels through the electrolytic loosening system 64 not more than one mandrel 52 will be in contact with any of the bars 160 at any given time. If desirable, for a particular type of operation more than one bar 160 may be supported by each plate 163. Also, additional cooperating bars 160 may be provided for contacting the other end of the mandrel 52. Each bar 160 is mounted in the slots 164 so as to be urged by gravity into contact with the ends 168 of the mandrel 52. A stop member 170 limits the movement of the bars 160 toward the portion of the electrolytic loosening system 64 occupied by the container 68. Each bar 160 is provided with an arcuate shaped portion 159 which is first contacted by the end of the mandrel 52 so as to move gradually the bar 160 out of position against the stop member 170. In this manner, the movement of the initial mandrel through the electrolytic loosening system 64 will not be impeded in any manner by the bars 160. If desired, a resilient relationship may be provided for urging the bars 160 into contact with the end 168 of the mandrel 52. Each bar 160 is electrically connected to the negative terminal of the same electrical direct current source described above through a covered insulated electrically conductive wire strap 172 by connecting means 174. A cover 176, such as that illustrated in FIG. 6, may be utilized for protectively covering the various mechanisms associated with the electrolytic loosening system. A drain 178 operatively connected to the container 68 by housing 180 is utilized to periodically clean the container 68 and sheet 98 of resilient material.

Although in FIGS. 5–7, inclusive, the mandrel and pipe are supported on the rails 106 for movement through the electrolytic loosening system 64, it is to be readily understood that the mandrel and pipe could be moved through the electrolytic loosening system 64 by supporting the mandrel and pipe completely by the sheet 98 of resilient material. Under these conditions, the electrical contact between the mandrel 52 and the negative terminal of the electrical direct current source is through the bars 160.

The operation of the apparatus illustrated in FIGS. 5–7, inclusive, is similar to the operation of the apparatus schematically illustrated in FIGS. 1–4, inclusive, described above. The container 68 is filled to a desired level with an electrolytic solution. The electrolyte 100 may comprise many of the known base or salt solutions such as a calcium hydroxide, sodium chloride, sodium hydroxide and other similar types and is of a nature to be compatible with asbestos-cement pipe. Also, as described above, other types of electrodes may be substituted such as a semi-liquid such as mercury or a gelatin type or carbon granules held together by a suitable binder. In the preferred embodiment of the instant invention, the electrolyte 100 comprises a sodium hydroxide solution having a concentration between 1 and 3%. Sodium hydroxide is utilized in the preferred embodiment of the invention because it develops no toxic gas; at room temperature has good electrical conductivity; has high electrical conductivity in relatively low concentrations; and has very little side reaction with the carbon plates. The solution of the electrolyte in the container 68 is maintained at the proper concentration by the placing of sodium hydroxide tablets in the reservoir tank 104 for circulation by the pumping system into the container 68.

The number of lugs 108, required for the particular period of loosening, are secured to the chains 110 at predetermined spaced intervals regulated by the number of mandrels to be positioned at any one time in the electrolytic loosening system 64. The number of bars 160 on each side of the apparatus is determined by the amount of time necessary for each mandrel to be immersed in the electrolytic solution to effect the loosening of the asbestos-cement pipe 54 from the mandrel 52. In most instances, the container 68 is between 8 to 14 feet in width and from 4–14 feet in length wherein the length extends in the direction parallel to the movement of the chains 110. The chains 110 are driven by the sprockets 112 at speeds from 2 feet per minute to 24 feet per minute, which speeds are controlled by the variable drive motor 134.

To operate the system illustrated in FIGS. 5–7, inclusive, the container 68 is filled with an electrolyte, the desired number of bars 160 are provided for the apparatus and the desired number of lugs 108 are secured to the chains 110. The plate 92 is electrically connected to the positive terminal of the electrical direct current source and the rails 106 and bars 160 are electrically connected to the negative terminal of the same electrical direct current source. Experience has demonstrated that because of many factors, including particularly the physical characteristics of the mandrels on which asbestos-cement pipe is presently formed, an electrical direct current flowing as described above in the preferred embodiments of the invention is essential for effecting the loosening of the wet asbestos-cement pipe from the mandrel in commercial production thereof using the preferred apparatus described above. The movement of the various components is then initiated. A mandrel 52 having an asbestos-cement pipe 54 formed thereon and bonded thereto is positioned by the arms 56 into the waiting stations 60. A pair of cooperating lugs 108 through the nylon rollers 146 contact the mandrel 52 adjacent each end thereof to move the mandrel 52 from the waiting stations 60 onto the guide rails 106 for rolling movement thereover. As the mandrel 52 rolls over the guide rails 106, the asbestos-cement pipe 54 comes into contact with the sheet 98 of resilient material. The container 68 is adjusted through the hand wheel 134 and pistons 76 so as to provide the desired degree of contact between the asbestos-cement pipe 54 and the sheet 98 of resilient material so that the asbestos-cement pipe slightly depresses the sheet 98 at the contact area. As the mandrel 52 leaves the waiting stations 60 for movement through electrolytic loosening system 64, the ends 168 of the mandrel 52 contact the arcuate leading edge 159 of each of the first pair of cooperating bars 160 to move the bar 160 from engagement against the stop 170 so that the bar 160 is urged by gravity against the ends 168 of the mandrel. As the mandrel 52 with the asbestos-cement pipe 54 passes through the electrolytic loosening sytsem 64 with the mandrel 54 in contact with the resilient sheet 98, an electrical direct current is passed from the electrical direct current source (not shown) through the graphite plate 92, the electrolyte 100, provided by capillary action by the resilient sheet 98, the wet asbestos-cement pipe 54, the mandrel 52, the rails 150 and bars 160 back to the electrical direct current source. The current passing through each asbestos-cement pipe and mandrel in the electrolytic loosening system 64 of the instant invention, varies between 25 and 60 amperes but in most instances is approximately 40 amperes and has a voltage drop between 35 and 50 volts which in most instances is approximately 40 volts. Since the loosening of the asbestos-cement pipe from the mandrel is dependent upon the amount of current applied to the wet pipe and mandrel during passage thereof through the system, the amount of current used in any instance depends upon the available dwell time of each mandrel in the system. Therefore, for any particular type of asbestos-cement pipe, the total current utilized depends upon the length of the container 68 and the speed of the conveyor chains 110. After each mandrel passes through the electrolytic system 64, it is conveyed by any conventional mechanisms, such as rails 180, to a station where the mandrels are withdrawn from the pipe.

During one operation of the apparatus illustrated in FIGS. 5–7, inclusive, asbestos-cement pipe having a diameter of approximately 3½ inches and a wall thickness of approximately ⅜ of an inch were loosened wherein the container 68 was filled to the proper level with an electrolyte 100 comprising a sodium hydroxide solution having a solution concentration of approximately 2.5%. The rails 150 and bars 160 were connected to the negative terminal of an electrical direct current source and the plate 92 was connected to the positive terminal of the same electrical direct current source so that a current of approximately 40 amperes was passed through each pipe at all times during its passage through the electrolytic system 64 and wherein voltage drop across each pipe at all times was approxmiately 40 volts. The conveyor lugs 108 moved each mandrel 52 and the associated asbestos-cement pipe 54 thereon through the electrolytic loosening system 64 at a rate of speed of approximately 6.7 feet per minute so that each mandrel 52 and associated asbestos-cement pipe 54 passed through the electroyltic loosening system 64 in approximately 45 seconds. The apparatus of FIGS. 5–7, inclusive, was constructed to have three sets of cooperating pairs of bars 160 so that at any given instance, three mandrels with asbestos-cement pipe formed thereon were being subjected to the electrolytic loosening action of the system 64. For this function, sufficient lugs 108 were positioned on the chain 110 so as to move a mandrel 52 with an asbsetos-cement pipe 54 formed thereon from the waiting station 60 into the electrolytic loosening system 64 for passage therethrough approximately every 15 seconds. In all instances, the electrolytic loosening system 64 functioned effectively to loosen the asbestos-cement pipe 54 from the mandrel 52 so that each mandrel 52 was pulled from the asbestos-cement pipe 54 without detrimental damage to the ends of the asbestos-cement pipe 54.

Although the construction illustrated in FIGS. 5–7, inclusive, is similar only to that schematically illustrated in FIGS. 1 and 2, it is to be understood that the container 68 and the associated elements therefor may readily be fashioned in accordance with that structure schematically illustrated in FIGS. 3 and 4.

While the invention has been described in rather full detail, it will be understood that these details need not be strictly adhered to and that various changes and modifications may suggest themselves to one skilled in the art, all falling within the scope of the invention as defined by the subjoined claims.

What we claim is:

1. A method of loosening a wet asbestos-cement pipe from an electrically conductive mandrel to which it is bonded comprising:
   (a) arranging an electrically conductive mandrel having a wet asbestos-cement pipe bonded thereto for rotational movement,
   (b) establishing intimate contact between a portion of the area of the outer surface of said pipe and an electrically conductive readily conformable material, which contact extends throughout the longitudinal extent of said pipe and is substantial and continuous throughout said portion,
   (c) forming an electric circuit including said material, said pipe, and said mandrel as series associated elements,
   (d) effecting relative rotational movement between said pipe and said material for at least one complete revolution of said pipe so as to effect said intimate contact between said material and successive portions of the outer surface of said pipe, and
   (e) loosening said pipe from said mandrel by passing a direct electric current through said circuit.

2. A method as defined in claim 1 wherein said electrically conductive readily conformable material is an electrolytic solution.

3. A method of loosening a wet asbestos-cement pipe from an electrically conductive mandrel to which it is bonded comprising:
   (a) arranging an electrically conductive mandrel having a wet asbestos-cement pipe bonded thereto for rotational movement,
   (b) establishing intimate contact between a portion of the area of the outer surface of said pipe and an electrically conductive readily conformable material, which contact extends throughout the longitudinal extent of said pipe and is substantial and continuous throughout said portion,
   (c) forming an electric circuit including said material, said pipe, and said mandrel as series associated elements,
   (d) effecting relative rotational movement between said pipe and said material by rolling said pipe over said material for at least one complete revolution of said pipe so as to effect said intimate contact between said material and successive portions of the outer surface of said pipe, and
   (e) loosening said pipe from said mandrel by passing a direct electric current through said circuit.

4. A method as defined in claim 3 wherein said electrically conductive readily conformable material is an electrolytic solution.

5. Apparatus for loosening a wet asbestos-cement pipe from an electrically conductive mandrel to which it is bonded comprising:
   (a) an electrically conductive mandrel having a wet asbestos-cement pipe bonded thereto,
   (b) means for arranging said mandrel and said pipe for rotational movement,
   (c) an electrically conductive readily conformable material,
   (d) means for establishing intimate contact between a portion of the area of the outer surface of said pipe and said material, which contact extends throughout the longitudinal extent of said pipe and is substantial and continuous throughout said portion,
   (e) means for forming an electric circuit including said material, said pipe, and said mandrel as series associated elements,
   (f) means for effecting relative rotational movement between said pipe and said material for at least one complete revolution of said pipe so as to effect said intimate contact between said mandrel and successive portions of the outer surface of said pipe,
   (g) a direct current electric source, and
   (h) means for loosening said pipe from said mandrel by electrically connecting said electric circuit with said direct current electric source during said relative movement of said pipe and said material.

6. Apparatus as defined in claim 5 wherein said electrically conductive readily conformable material comprises an electrolytic solution.

7. Apparatus for loosening a wet asbestos-cement pipe from an electrically conductive mandrel to which it is bonded comprising:
   (a) an electrically conductive mandrel having a wet asbestos-cement pipe bonded thereto,
   (b) means for arranging said mandrel and said pipe for rotational movement,
   (c) a container having an electrolytic solution therein,
   (d) means comprising a readily conformable material at least partially submerged in said electrolytic solution so as to have least one exposed surface area containing at least a portion of said electrolytic solution,
   (e) means for establishing intimate contact between a portion of the area of the outer surface of said pipe and said electrolytic solution contained in a portion of said surface area, which contact extends throughout the longitudinal extent of said pipe and is substantial and continuous throughout said portion,
   (f) means for forming an electric circuit including said electrolytic solution, said pipe, and said mandrel as series associated elements,
   (g) means for effecting relative rotational movement between said pipe and said electrolytic solution by rolling said pipe over said surface area while in contact with said electrolytic solution therein for at least one complete revolution of said pipe so as to effect said intimate contact between said electrolytic solution and successive portions of the outer surface of said pipe,
   (h) a direct current electric source, and
   (i) means for loosening said pipe from said mandrel by electrically connecting said electric circuit with said direct current electric source during said relative movement of said pipe and said material.

8. Apparatus as defined in claim 7 and further comprising:
   (a) an electrically conductive plate submerged in said electrolytic solution for supporting said means having said exposed surface area.

9. Apparatus for loosening a wet asbestos-cement pipe from an electrically conductive mandrel to which it is bonded comprising:
   (a) a container having an electrolytic solution therein,
   (b) means comprising a readily conformable material at least partially submerged in said electrolytic solution so as to have at least one exposed surface area containing at least a portion of said electrolytic solution,
   (c) a plurality of electrically conductive mandrels each having a wet asbestos-cement pipe bonded thereto,
   (d) a pair of spaced substantially parallel guide rails mounted adjacent said container and being adapted to support the ends of said mandrel with said pipe bonded thereto,
   (e) means for feeding said mandrels at periodic timed intervals to said guide rails for passage thereover,
   (f) means for establishing intimate contact between a portion of the area of the outer surface of said pipe and said electrolytic solution contained in a portion of said surface area, which contact extends throughout the longitudinal extent of said pipe and is substantial and continuous throughout said portion,
   (g) means for applying a positive force on each of said mandrels during passage over said guide rails to effect relative rotational movement between said pipe and electrolytic solution by rolling said pipe over said surface area while in contact with said electrolytic solution therein for at least one complete revolution of said pipe so as to effect said intimate contact between said electrolytic solution and successive portions of the outer surface of said pipe, (h) a plurality of electrical conducting means mounted at spaced but adjacent intervals along said guide rails, (i) means for urging each of said electrical conducting means in sequence into contact with at least one end portion of each of said mandrels during movement of said mandrels over said guide rails, (j) means for forming an electric circuit including said electrolytic solution, said pipe, said mandrel, and said electrical conducting means as series associated elements, (k) a direct current electric source, and (l) means for loosening said pipe from said mandrel by electrically connecting said electric circuit with said direct current electric source during said relative movement of said pipe and said electrolytic solution.

References Cited by the Examiner
UNITED STATES PATENTS

| | | | |
|---|---|---|---|
| 2,430,411 | 11/47 | Rembert | 162—230 |
| 2,892,750 | 6/59 | Ramm | 162—192 |
| 2,953,672 | 9/60 | Wisken et al. | 219—71 |
| 2,992,157 | 7/61 | Whalen | 162—192 |

DONALL H. SYLVESTER, *Primary Examiner.*

MORRIS O. WOLK, *Examiner.*